United States Patent
Förster

(10) Patent No.: US 10,400,848 B2
(45) Date of Patent: Sep. 3, 2019

(54) CONTROL ARRANGEMENT FOR A FREQUENCY-DEPENDENT DAMPING VALVE DEVICE OF A VIBRATION DAMPER AND METHOD FOR PLASTIC DEFORMATION OF THE POT FLOOR OF THE CONTROL ARRANGEMENT

(71) Applicant: ZF FRIEDRICHSHAFEN AG, Friedrichshafen (DE)

(72) Inventor: Andreas Förster, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/769,706

(22) PCT Filed: Sep. 26, 2016

(86) PCT No.: PCT/EP2016/072798
§ 371 (c)(1),
(2) Date: Apr. 19, 2018

(87) PCT Pub. No.: WO2017/067746
PCT Pub. Date: Apr. 27, 2017

(65) Prior Publication Data
US 2018/0313425 A1    Nov. 1, 2018

(30) Foreign Application Priority Data

Oct. 23, 2015    (DE) .......................... 10 2015 220 707

(51) Int. Cl.
*F16F 9/512*    (2006.01)
*F16F 9/32*    (2006.01)

(52) U.S. Cl.
CPC .......... *F16F 9/5126* (2013.01); *F16F 9/3214* (2013.01); *F16F 2222/12* (2013.01);
(Continued)

(58) Field of Classification Search
CPC .. F16F 9/5126; F16F 9/3214; F16F 2230/183; F16F 2236/04; F16F 2222/12; F16F 2232/08
See application file for complete search history.

(56) References Cited

U.S. PATENT DOCUMENTS

| 4,953,671 | A |   | 9/1990 | Imzizumi |
| 5,248,014 | A | * | 9/1993 | Ashiba ...................... F16F 9/50 188/282.5 |

(Continued)

FOREIGN PATENT DOCUMENTS

| DE | 585 460 | 10/1934 |
| DE | 35 32 633 | 4/1986 |

(Continued)

*Primary Examiner* — Vishal R Sahni
(74) *Attorney, Agent, or Firm* — Cozen O'Connor

(57) ABSTRACT

A control arrangement for a frequency-dependent damping valve having a control pot and an axaially displaceable control piston that axially limits a control space in the control pot and is connected to the damping valve device via an inlet connection. A spring element is arranged between the control piston and the damping valve that introduces a spring force axially into the control piston and the damping valve. When the control piston displaces towards the damping valve and the spring element increases the pressing pressure of the valve disks to increase the damping force. An axial position of a stop in the control arrangement is adjusted by plastic deformation of the pot base. A deformation portion produced by the plastic deformation and a depression partially receives the guide bush. A cross section of the depression corresponds to an outer cross section of the guide bush received in the depression.

8 Claims, 3 Drawing Sheets

(52) U.S. Cl.
CPC ..... *F16F 2230/183* (2013.01); *F16F 2232/08* (2013.01); *F16F 2236/04* (2013.01)

(56) References Cited

U.S. PATENT DOCUMENTS

| | | | |
|---|---|---|---|
| 6,220,409 B1* | 4/2001 | Deferme | F16F 9/3228 188/282.1 |
| 8,590,680 B2* | 11/2013 | Maeda | F16F 9/34 188/282.8 |
| 8,651,252 B2* | 2/2014 | Katayama | F16F 9/3484 188/282.6 |
| 9,309,945 B2* | 4/2016 | Maeda | F16F 9/19 |
| 2006/0283675 A1 | 12/2006 | Teraoka et al. | |

FOREIGN PATENT DOCUMENTS

| | | |
|---|---|---|
| DE | 44 41 047 | 1/1996 |
| DE | 197 31 138 | 2/1999 |
| JP | H06 207636 | 7/1994 |
| WO | WO 2011/071120 | 6/2011 |

* cited by examiner

CONTROL ARRANGEMENT FOR A FREQUENCY-DEPENDENT DAMPING VALVE DEVICE OF A VIBRATION DAMPER AND METHOD FOR PLASTIC DEFORMATION OF THE POT FLOOR OF THE CONTROL ARRANGEMENT

CROSS REFERENCE TO RELATED APPLICATIONS

This is a U.S. national stage of application No. PCT/EP2016/072798, filed on Sep. 26, 2016. Priority is claimed on German Application No. DE102015220707.2, filed Oct. 23, 2015, the content of which is incorporated here by reference.

BACKGROUND OF THE INVENTION

1. Field of the Invention

The invention is directed to a control arrangement for a damping valve device of a vibration damper with a frequency-dependent damping force characteristic.

2. Description of the Prior Art

A vibration damper in a motor vehicle damps the vibrations excited by an uneven road surface. In this regard, it is always necessary to find a compromise between driving safety and driving comfort. A vibration damper with a damping valve device that is adjusted to be hard and that has a high damping force characteristic is optimal for highly safe driving. If there is a high demand for comfort to be met, the damping valve device should be adjusted to be as soft as possible. It is very difficult to find this compromise in a vibration damper with a conventional, non-electronic damping valve device, which is adjustable by an actuator.

Damping valve devices with a frequency-dependent damping force characteristic are known in the art. They are outfitted with an additional electronic and/or mechanical control and switch an additional damping valve device on or off depending on a compression frequency and/or rebound frequency of the vibration damper. DE 44 41 047 C1, US 2006 28 36 75 A or U.S. Pat. No. 4,953,671 A may be cited as examples.

There are also known solutions in which a control arrangement is arranged at the piston rod coaxial to the damping piston comprising a control pot and an axially displaceable control piston arranged in the control pot. The control piston axially limits a control space which is enclosed in the control pot and connected to the damping valve device via an inlet connection. A spring element is arranged between the control piston and damping valve and introduces a spring force axially into the control piston on the one hand and into the damping valve. When the control space is filled with damping fluid, the control piston displaces in direction of the damping valve and, via the spring element, increases the pressing pressure of the valve disks of the damping valve, which increases the damping force.

However, all known damping valve devices are characterized by high complexity, among other reasons because they require highly precise adjustment. In particular, it is difficult to adjust the soft and the hard damping characteristic in these vibration dampers without additional control elements. For instance, the soft damping force characteristic could be defined by adding additional spacer elements between the control piston and the pot base of the control pot. For this purpose, however, the control arrangement would have to be disassembled into individual parts and assembled again multiple times under certain circumstances during adjustment of the required soft damping force characteristic, so that manufacturing cycle times which are usually very strictly planned could not be adhered to.

SUMMARY OF THE INVENTION

An object of one aspect of the present invention is to provide a simply constructed, economical control arrangement for a damping valve device that has a frequency-dependent damping force characteristic and allows the damping force characteristic to be adjusted in a simple manner and a method for adjusting the damping force characteristic in a simple and economical manner.

According to one aspect of the invention, an axial position of a stop in the control arrangement is adjusted by a plastic deformation of the pot base, the pot base has a deformation portion that is produced by the plastic deformation and has a depression which partially receives a guide bush, and a cross section of the depression corresponds to a outer cross section of a portion of the guide bush received in the depression.

The control arrangement advantageously comprises a sealing ring that seals the control piston relative to the pot wall of the control pot. This minimizes the risk of a scattering in the damping characteristic which could occur owing to possible uncontrolled bypasses between the control piston and the pot wall.

It can be provided in an advantageous manner that the control arrangement has a supporting disk arranged axially adjacent to the spring arrangement and axially supports the spring arrangement. However, the spring arrangement can also be arranged, for example, directly at a valve disk of an adjacently arranged damping piston of the vibration damper.

According to a further advantageous constructional variant, the control arrangement has a spacer disk arranged between the control piston and the spring arrangement that defines the second axial end position of the control piston. The second axial end position of the control piston in the control arrangement can be adjusted, for example, through a plastic deformation of the spacer disk.

According to a further advantageous constructional variant, the spring arrangement can comprise at least one spring element constructed as a helical spring, a tube spring, a spring plate, or a spring disk. The spring arrangement commonly comprises at least two spring elements. At least one annular spacer element can be arranged between the spring elements, and the axial extension of the spacer element influences the preloading of the spring arrangement.

The plastic deformation of the pot base of the control pot for adjusting the axial position of the stop, which defines the soft damping force characteristic, is advantageously carried out by a method which includes at least the following steps:
  fixation of the control arrangement between a first component part and a second component part of a fixing device, the control arrangement is arranged between the first component part and the second component part as a constructional unit comprising at least the guide bush and the control pot and is clamped accompanied by introduction of a fixing force, and the guide bush and the control pot are arranged coaxial to one another with respect to a longitudinal axis of the control arrangement,
  plastic deformation of the pot base of the control pot in direction of the guide bush by a deformation tool, wherein the deformation tool comes in contact by a contact portion thereof with the pot base and executes a defined path parallel to the longitudinal axis of the control arrangement in direction of the guide bush and introduces into the pot base a defined force directed toward the guide bush so that this pot base is plastically deformed, and the guide bush axially supports the pot base at the side remote of the deformation tool and serves as an abutment for the deformation tool.

It can advantageously be provided that the contact portion of the deformation tool has a recess, and the cross section of the recess substantially corresponds to the outer cross section of the portion of the guide bush. A radial expansion of the force introduced into the pot base through the deformation tool is minimized in this way. A distortion or a warping of the housing is prevented in this way, and the pot base is fastened at the deformation point between the deformation tool and the guide sleeve. This type of plastic deformation is characterized by high accuracy because the pot base is virtually completely prevented from springing back. This allows a very accurate adjustment of the axial position of the stop inside the control arrangement.

The plastic deformation of the pot base can be carried out after assembly of the control arrangement. This advantageously obviates the inclusion of additional spacer elements between the control piston and the pot base of the control pot, and the soft damping force characteristic can be adjusted by producing a stop of a defined height after the control arrangement has already been assembled.

BRIEF DESCRIPTION OF THE DRAWINGS

The invention will be described more fully referring to the following figures.

The drawings show.

DETAILED DESCRIPTION OF THE PRESENTLY PREFERRED EMBODIMENTS

Figure 1:
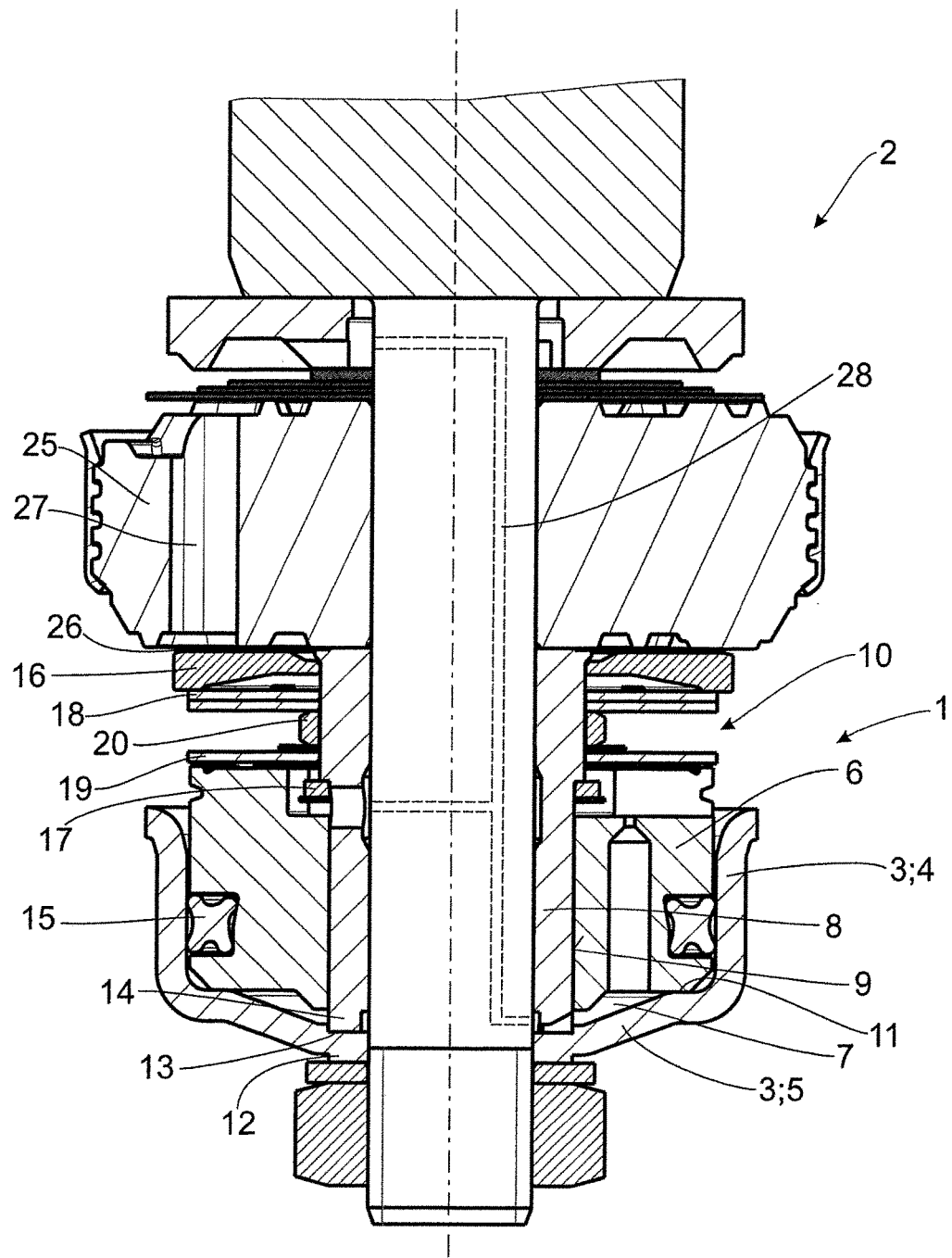
FIG. 1 is a sectional view of a damping valve device with a control arrangement.

FIG. 1 shows a damping valve device 2 in cross section with a control arrangement 1. The damping valve device 2 comprises a damping piston 25 and the control arrangement 1 which are arranged coaxial with respect to one another at a piston rod neck of a piston rod and are axially secured to the piston rod by a fastening nut.

The damping piston 25 comprises at least one valve disk 26 that axially covers a first fluid channel 27 formed in the piston. The damping valve device 2 is usually arranged in a cylinder of a vibration damper, which cylinder is filled with a damping fluid and is not shown here, and divides this cylinder into a working chamber on the piston rod side and a working chamber remote of the piston rod. During a springing movement of the vibration damper, the damping fluid is forced through the first fluid channel 27. This flow of damping fluid is then damped by the valve disk 26. The damping force depends at least partially on the spring elasticity of the valve disk 26.

The control arrangement 1 is arranged coaxial to the damping piston 25. This control arrangement 1 comprises a control pot 3 with a cylindrical pot wall 4 and a disk-shaped pot base 5 arranged adjoining the pot wall 4 and a control piston 6 which is axially displaceably arranged in the control pot 3 and which is sealed relative to the pot wall 4 by the sealing ring 15. The control piston 6 axially limits a control space 7, which is enclosed in the control pot 3 and is connected to the working chamber of the cylinder on the piston rod side via a second fluid channel 28. A spring arrangement 10 is arranged between the control piston 6 and the damping piston 25. The spring arrangement 10 axially introduces a spring force into the control piston 6 on the one hand and into the valve disk 26 of the damping piston 25 on the other hand. When the control space 7 is filled with damping fluid, the control piston is displaced in direction of the damping valve and increases the pressing pressure of the valve disks 26 of the damping piston 25 via the spring element 10, which increases the damping force. The spring arrangement 10 shown in FIG. 1 comprises a plurality of spring elements 18, 19, an annular spacer element 20 being arranged between the spring elements 18, 19. A supporting disk 16 is arranged between spring element 18 and valve disk 26. This supporting disk 16 is axially displaceable at the surface of the guide bush 8. Guide bush 8 has at its end facing damping piston 25 a radial diameter enlargement which axially limits the displacement path of supporting sleeve 16 in direction of damping valve 25.

The pot base 5 of control pot 3 provides an axial stop 11 for control piston 6 defines a first axial position of control piston 6 in control arrangement 1.

A spacer disk is arranged between control piston 6 and spring arrangement 10 for axially limiting the axial displacement path of control piston 6 in direction of spring arrangement 10. The spacer disk 17 accordingly defines a second axial end position of control piston 6 in control arrangement 1.

Figure 2:
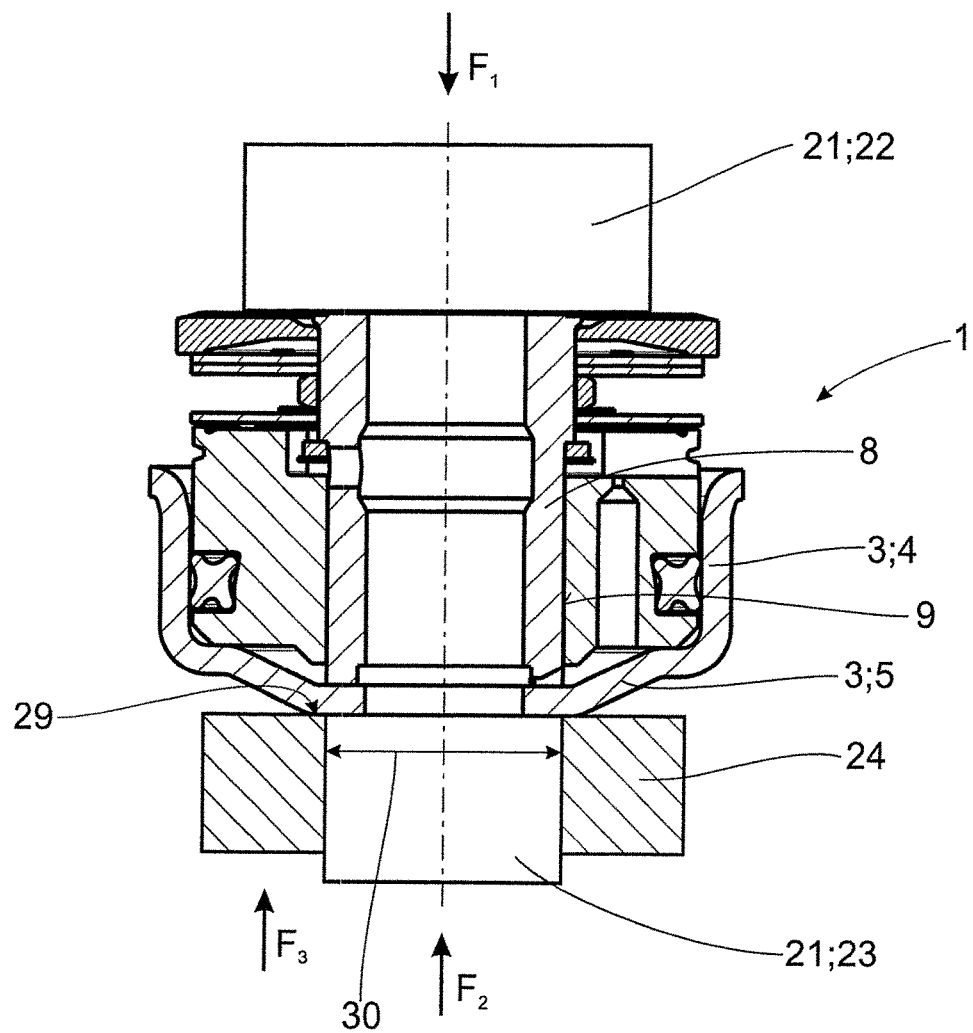
FIG. 2 is a schematic view of a control arrangement prior to the plastic deformation of the pot base.
Figure 3:
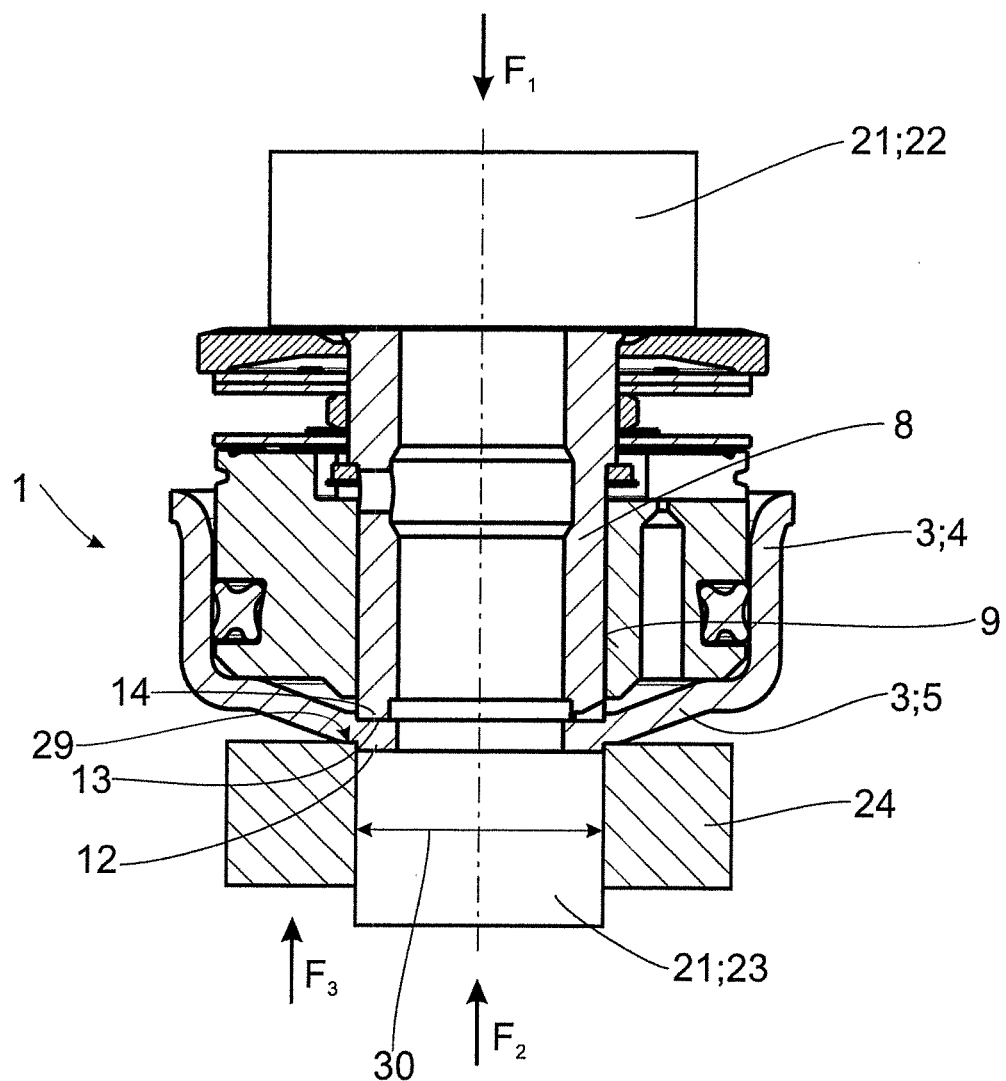
FIG. 3 is a schematic view of a control arrangement after the plastic deformation of the pot base.

FIG. 2 and FIG. 3 illustrate the method for deforming the pot base 5 of control pot 3 of control arrangement 1.

FIG. 2 shows the control arrangement 1. This control arrangement 1 is fixed between a first component part 22 and a second component part 23 of a fixing device 21. The control arrangement 1 shown in FIGS. 2 and 3 comprises all of the component parts shown in FIG. 1. However, it is also possible to configure control arrangement 1 as a constructional unit comprising at least guide bush 8 and control pot 3 between first component part 22 and second component part 23 and to clamp it by introducing fixing forces F2; F3.

Guide bush 8 and control pot 3 are arranged coaxial to one another with respect to a longitudinal axis A of control arrangement 1. The end portion 14 of guide bush 8 axially contacts pot base 5.

Further, FIGS. 2 and 3 show a deformation tool 24 with a contact portion 29 that comes in contact with the side of the pot base 5 of control pot 3 opposite the guide bush. Guide bush 8 axially supports pot base 5 on the side remote of deformation tool 24 and serves as an abutment for deformation tool 24.

The exact flow of the method for plastic deformation of pot base 5 of control pot 3 can be gathered by viewing FIGS. 2 and 3 in conjunction.

Deformation tool 24 executes a defined path parallel to the longitudinal axis A of control arrangement 1 in direction of guide bush 8 and introduces a defined force F4 directed toward guide bush 8 into pot base 5. Pot base 5 is plastically deformed in this way.

Contact portion 29 of deformation tool 24 has a recess 30, and the cross section of recess 30 substantially corresponds to the outer cross section of portion 14 of guide bush 8.

In this way, a radial expansion of the force F3 introduced into pot base 5 through deformation tool 24 is minimized. A distortion or a warping of the control pot 3 is prevented in this way, and the pot base 5 is fastened at the deformation point between the deformation tool 24 and the guide sleeve 8. This type of plastic deformation is characterized by high accuracy because a springing back of the pot base 5 is virtually completely prevented. This allows a very accurate adjustment of the axial position of the stop 14 inside the control arrangement 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A control arrangement for a frequency-dependent damping valve device of a vibration damper, comprising:
   a control pot having a cylindrical pot wall and a disk-shaped pot base arranged adjacent to the pot wall;
   a control piston that is arranged axially displaceably in the control pot and axially limits a control space enclosed in the control pot, wherein the control space is filled with a damping fluid during operation of the control arrangement;
   a guide bush arranged radially centered in the control pot adjoining the pot base, wherein the control piston encloses the guide bush in circumferential direction, the control piston being slidingly axially displaceable between a first axial end position and a second axial end position of an outer surface of the guide bush and configured to change a control space volume;
   a spring arrangement axially arranged adjoining the control piston that acts on the control piston with a defined spring force in a direction of pot base; and
   at least one stop of the pot base that projects into the control space configured to at least indirectly axially support the control piston and defines the first axial end position of the control piston;
   wherein an axial position of the at least one stop in the control arrangement is adjusted by a plastic deformation of the pot base;
   wherein the pot base has a deformation portion produced by the plastic deformation and which has a depression that partially receives the guide bush; and
   wherein a cross section of the depression corresponds to an outer cross section of a portion of the guide bush received in the depression.

2. The control arrangement for a frequency-dependent damping valve device according to claim 1, further comprising:
   a sealing ring configured to seal the control piston relative to the pot wall of the control pot.

3. The control arrangement for a frequency-dependent damping valve device according to claim 1, further comprising:
   a supporting disk axially adjacent to the spring arrangement that axially supports the spring arrangement.

4. The control arrangement for a frequency-dependent damping valve device according to claim 3, further comprising:
   a spacer disk arranged between the control piston and the spring arrangement that defines the second axial end position of the control piston.

5. The control arrangement for a frequency-dependent damping valve device according to claim 4, wherein the second axial end position of the control piston is adjusted by a plastic deformation of the spacer disk.

6. The control arrangement for a frequency-dependent damping valve device according to claim 1, wherein the spring arrangement comprises at least one spring element configured as one of a helical spring, a tube spring, a spring plate, and a spring disk.

7. The control arrangement for a frequency-dependent damping valve device according to claim 1, wherein the spring arrangement comprises at least two spring elements and at least one annular spacer element arranged between the at least two spring elements, wherein preloading of the spring arrangement is adjusted through axial extension of the at least one annular spacer element.

8. The control arrangement for a frequency-dependent damping valve device according to claim 1, wherein based on an amount of damping fluid flowing into the control space the control piston is slidingly axially displaced between the first axial end position and the second axial end position.

\* \* \* \* \*